United States Patent [19]
McClaren

[11] 3,746,395
[45] July 17, 1973

[54] MOBILE STORAGE BIN
[76] Inventor: Jay L. McClaren, P.O. Box 559, Litchfield, Minn. 55355
[22] Filed: Oct. 15, 1971
[21] Appl. No.: 189,652

[52] U.S. Cl.................. 298/27, 105/379, 296/26
[51] Int. Cl................... B60p 1/56, B62d 33/08
[58] Field of Search.................. 298/24, 27, 28; 52/194, 196, 197; 105/379, 389, 393; 220/22.1, 22.2, 22.5; 280/34; 296/23, 26; 222/176, 476

[56] References Cited
UNITED STATES PATENTS
2,656,216  10/1953  Bobroff............................. 105/393

FOREIGN PATENTS OR APPLICATIONS
967,762   4/1950   France......................... 296/23 C
115,749  12/1917   Great Britain.................. 105/379

Primary Examiner—Richard J. Johnson
Assistant Examiner—Reinhard Eisenzopf
Attorney—H. Dale Palmatier

[57] ABSTRACT

A mobile storage bin with ground travel wheels and to be attached to a towing vehicle, and having a telescoping sidewall section extendible upwardly to increase the volume capacity of the bin; and a cable and winch apparatus for raising and lowering the telescoping wall sections.

4 Claims, 6 Drawing Figures

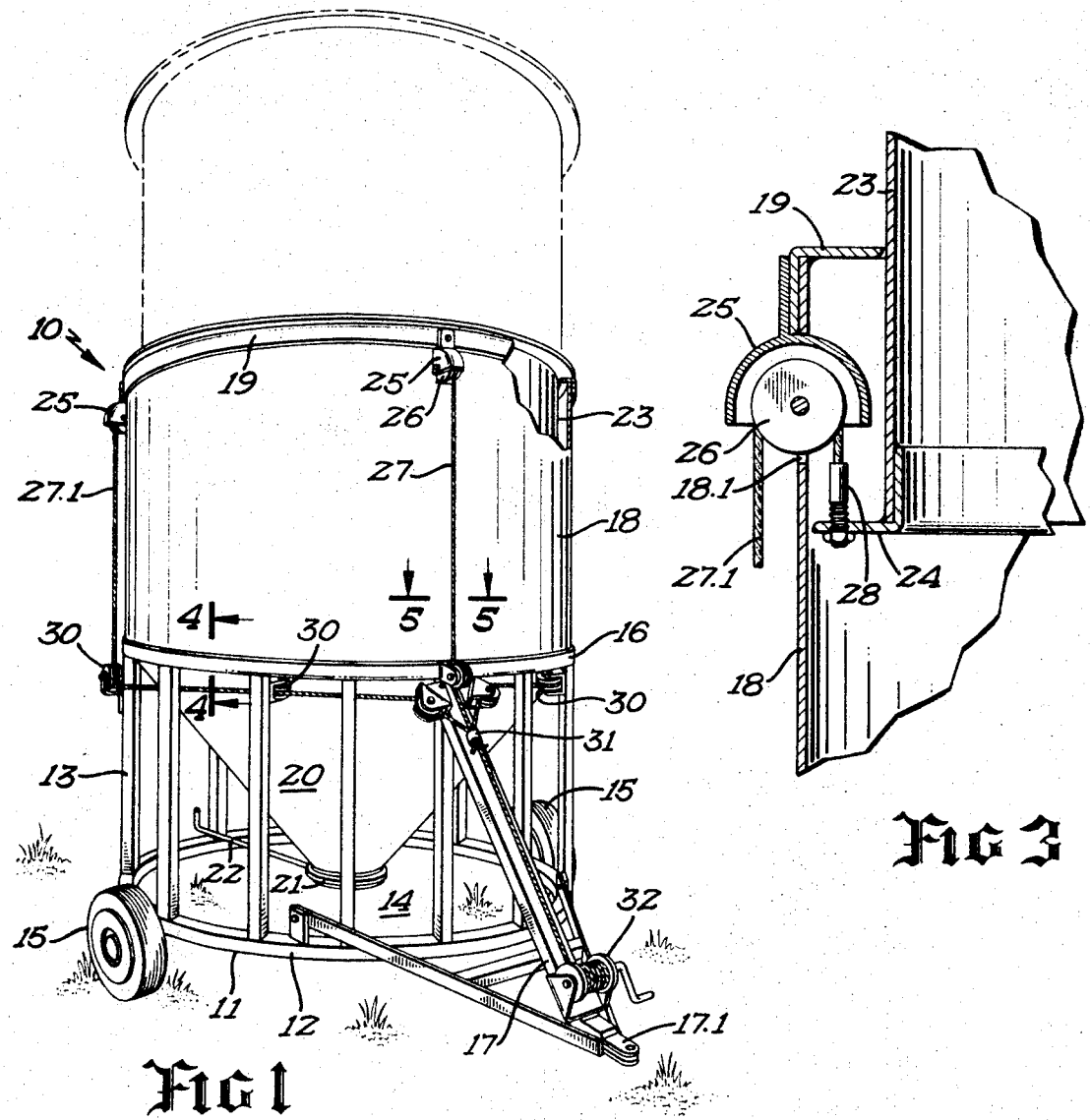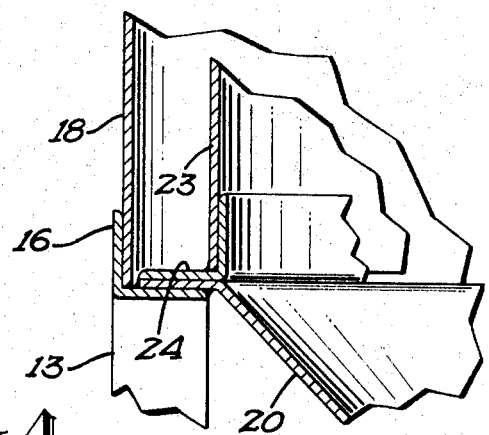

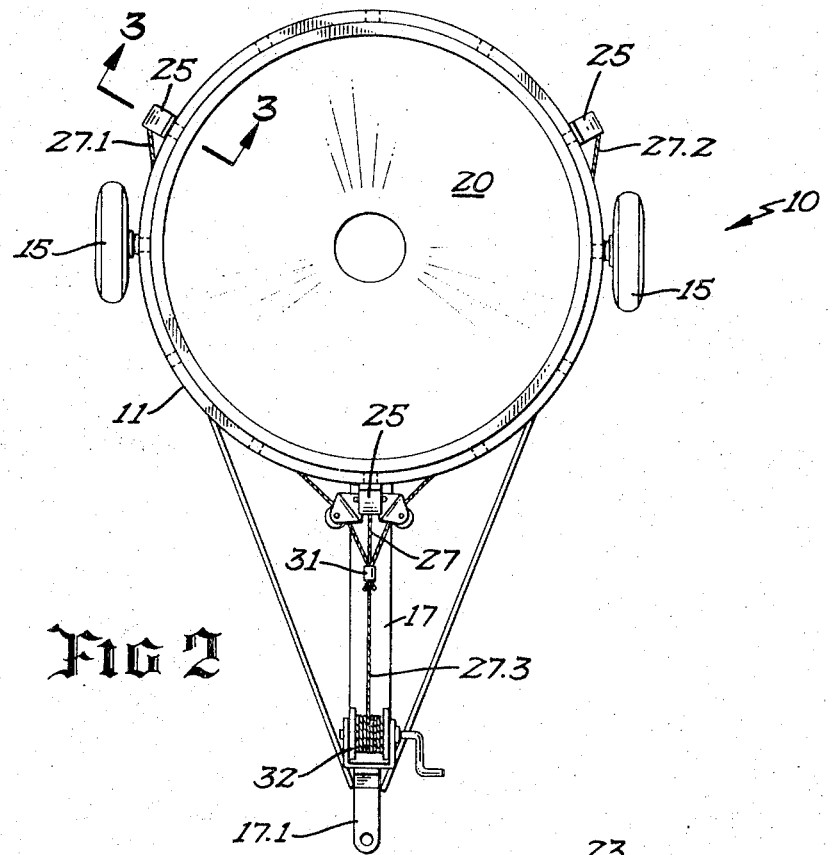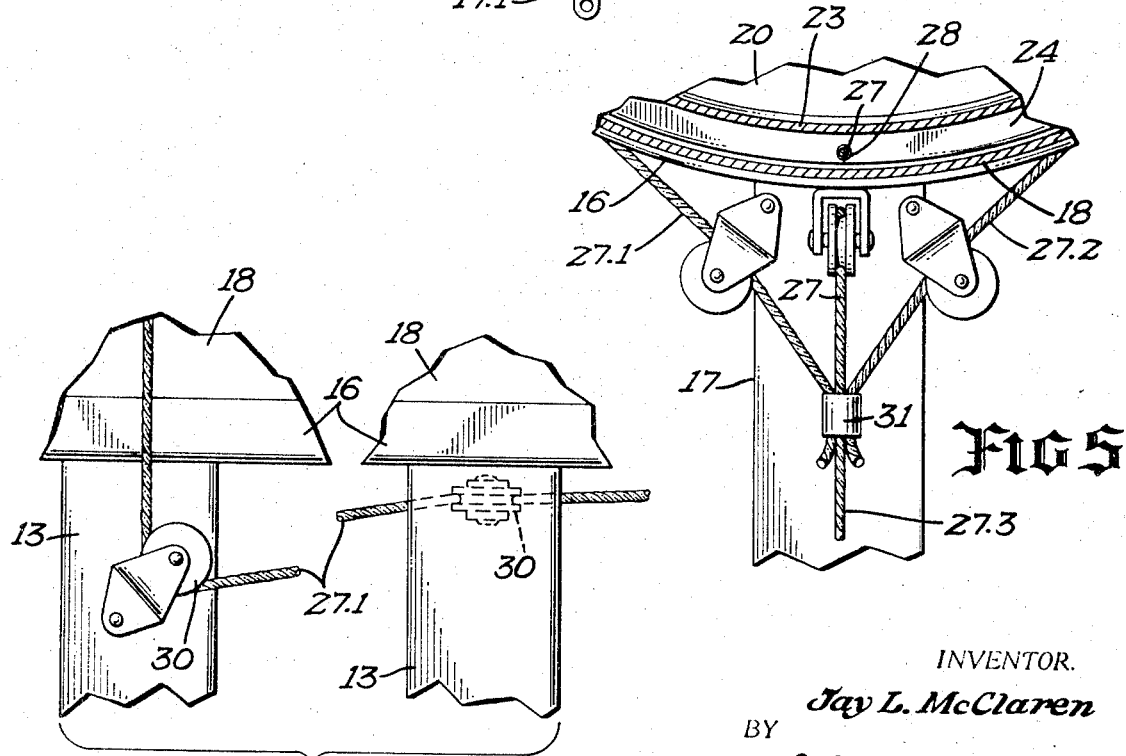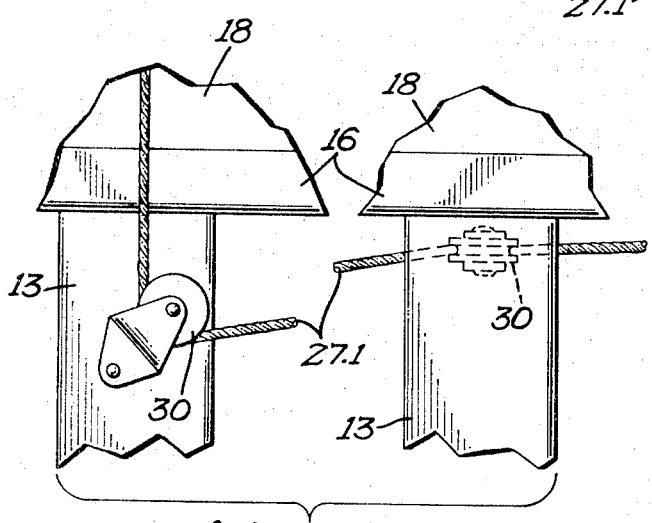

3,746,395

MOBILE STORAGE BIN

BRIEF SUMMARY OF THE INVENTION

The present invention comprises a mobile storage bin for grain and the like, and is particularly useful for temporary storage of grain during harvest season. For instance, shelled corn which is waiting to be dried may be stored, and, as the drying process is completed on successive quantities of corn, the wet corn in the temporary bin is supplied to refill the dryer.

The temporary storage bin is useful, first at one location and then at other locations, depending upon the requirements of grain handling problems that may exist from time to time at various locations on farms and other processing installations. The usual grain bin, of such a capacity as to be useful, is hardly transportable along a highway because of its height and because of the height restriction for vehicles traveling on the highway.

This extendible temporary storage bin has a telescoping sidewall section to increase the volume within the bin; and the bin is provided with a hopper bottom and a valve to close the discharge in the hopper bottom; the central area of the frame structure, beneath the hopper bottom, is open and unobstructed to permit a grain auger to be inserted into this unobstructed area to receive grain or corn from the bin for delivery elsewhere as into a dryer.

The mobile bin is provided with cables for raising and lowering the telescoping wall section of the bin, and the cables are controlled and operated by a single winch secured to the tongue of the frame structure.

BRIEF DESCRIPTION OF THE DRAWINGS

FIG. 1 is a perspective view of the invention with portions broken away for clarity of detail and showing the telescoping bin wall in collapsed condition for highway travel, and also showing, in dotted lines, the extended position of the bin sidewall.

FIG. 2 is a top plan view of the invention.

FIG. 3 is an enlarged detail section view taken approximately at 3—3 in FIG. 2, but with the bin sidewall telescopically extended upwardly.

FIG. 4 is an enlarged detail section view taken approximately at 4—4 in FIG. 1.

FIG. 5 is an enlarged detail section view taken approximately at 5—5 in FIG. 1.

FIG. 6 is an enlarged detail elevation view of a portion of the cable guiding and frame portions of the mobile storage bin.

DETAILED DESCRIPTION OF THE INVENTION

One form of the invention is shown in the drawings and is described herein. The mobile, variable size bin is indicated in general by the numeral 10 and includes a frame having a circumferential frame member 12 constructed of rigid tubing. The framework also includes a plurality of spaced apart upright struts 13 to facilitate obtaining access into the open and unobstructed central area 14 between opposite side portions of the frame which mount the rubber tired ground-engaging support wheels 15.

The frame 11 also includes a bin supporting top angle iron 16 extending peripherally.

The frame 11 also includes a forwardly and obliquely downwardly extending tongue 17 with a suitable end fitting 17.1 for attachment to the drawbar of a towing vehicle.

A bin sidewall 18 is substantially cylindrical in shape and is affixed to the peripheral angle iron 16 as by rivets or welding, and the sidewall 18 has an inwardly turned flange 19 formed of angle iron at the top edge, and the flange 19, or angle iron, extends around the entire periphery of the cylindrical wall 18.

A hopper bottom 20 converges in a downward direction, and a slide gate 21 is operated by a control rod 22 for opening and closing the grain outlet at the extreme lower portion of the hopper bottom 20. The outlet and gate or valve 21 of the hopper bottom is spaced above the ground level and above the unobstructed area between the opposite sides of the frame so as to permit insertion of a grain auger beneath the hopper bottom to carry away grain discharged through the outlet, and the grain auger may also project outwardly between adjoining upright struts 13 of the frame.

The bin 10 is also provided with a telescoping wall section 23 constructed of sheet metal and of cylindrical shape. The telescoping wall section 23 extends around the inner periphery of the bin wall 18 and in closely spaced relation therewith. In FIGS. 1 and 4, the telescoping wall section 23 is shown in its lowered condition, and it will be noted that the lower edge of the cylindrical wall section 23 has an outwardly turned flange formed by angle iron 24 affixed thereon as by rivets or welding and arranged so that the outer edge of the angle iron or flange 24 is in closely spaced relation with the stationary upright sidewall 18. In upward and downward movement of the telescoping wall 23, the flange 24 guides along the inner surface of the cylindrical sidewall 18.

In order to accomplish upward and downward movement of the telescoping wall section 23, identical pulley units 25 are affixed to the upper edge portion of the stationary sidewall 18 at peripherally spaced locations as seen in FIG. 2. The three equally spaced pulley units are all identical and have sheaves or pulleys 26 therein and adjacent openings or apertures 18.1 in the upright sidewall 18. Cables 27, 27.1 and 27.2 are each trained over the respective pulleys 26 as illustrated in FIGS. 1 and 3, and the inner ends of these cables are suspended along the inner side of the stationary bin sidewall 18 and are secured by fittings 28 to the outwardly turned flange or angle iron 24 at the lower edge of the telescoping wall section 23. The cables are also suspended downwardly along the outside of the stationary sidewall 18 to guiding pulleys 30 to direct the cables into the vicinity of the tongue 17. As illustrated in FIGS. 1 and 5, all of the cables 27, 27.1 and 27.2 are interconnected by a clamp 31, and all of the three cables are then connected by the cable section 27.3 to a winch 32 mounted on the tongue 17 of the frame. The winch 32 controls movement of the cables, both drawing them downwardly toward the winch and paying them out so as to raise and lower the telescoping wall section 23 as the winch drum is revolved.

Of course, the three cables acting simultaneously raise the telescoping wall section equally in all locations so that it will not tip and bind.

When the mobile bin 10 is in the collapsed condition shown in FIGS. 1 and 4, the tongue may be attached to the towing vehicle and the entire mobile unit may be towed behind the vehicle and along a highway. When the mobile bin 10 is to be set up for use, it will be located, according to the demands of the particular use and the winch 32 is operated to draw the cable over the pulleys and raise the telescoping wall section 23 into the dotted line position shown in FIG. 1 and so that the lower edge portion of the telescoping wall 23 is raised approximately to the pulley sheaves 26 as illustrated in FIG. 3. When the telescoping wall section 23 has been raised, the grain or corn will be directed into the interior of the bin as defined by wall section 23 and stationary wall 18. A grain auger has its receiving or inlet end directed beneath the discharge outlet of the hopper bottom 20, and as requirements of the job dictate, the valve 21 will be operated so as to draw quantities of the grain from the bin. When the bin has been emptied and requirements for its use have been completed, the winch 32 is again operated so as to lower the telescoping wall section 23 to the position shown in full lines in FIG. 1. When the telescoping wall section has been completely lowered, it will rest upon the peripheral angle iron 16 of the frame 11 as illustrated in FIG. 4 so that the tension on the cables can be relieved while the mobile unit is in transport.

Of course, a catch or latch mechanism may be employed for holding the telescoping wall section in its fully upwardly extended position so that the tension on the cables may be relieved. It will be recognized that when the bin is entirely full with the wall section 23 raised, the grain does exert a downward thrust on the wall section 23 as to increase the tension on the cables. The catch or latch mechanism may be used to support the wall section 23 to absorb the downward thrust of the grain applied to the wall section 23.

It will be seen that I have provided a new and novel mobile bin for temporary storage of grain wherein a bin is mounted on a mobile frame with ground support wheels and has a telescoping wall section which may be raised to increase the capacity of the bin during use and may be lowered during transport to provide safe conditions in compliance with highway regulations.

What is claimed is:

1. A mobile bin for temporary storage of grain and the like, comprising:
    a frame having ground engaging support wheels and a tongue for attachment to a towing vehicle;
    an upright bin on the frame and having a hopper bottom and an upright peripheral sidewall;
    a telescoping wall section within said peripheral sidewall and in closely spaced relation therewith; and
    means for raising and lowering said telescoping wall section relative to the sidewall to substantially vary the capacity of the bin,
    the hopper bottom being disposed between the wheels and having a grain outlet from which grain may be discharged, and controllable means at the grain outlet to regulate discharge of grain therefrom, there being an unobstructed space below the grain outlet for collection of grain discharged from the bin.

2. A mobile bin for temporary storage of grain and the like, comprising:
    a frame having ground engaging support wheels and a tongue for attachment to a towing vehicle;
    an upright bin on the frame and having a hopper bottom and an upright peripheral sidewall;
    a telescoping wall section within said peripheral sidewall and in closely spaced relation therewith; and
    means for raising and lowering said telescoping wall section relative to the sidewall to substantially vary the capacity of the bin,
    the hopper bottom of the bin being disposed between the wheels and having a grain outlet and valve to control the discharge of grain, and
    the frame defining an open and unobstructed area between the wheels and below the grain outlet for collection of grain discharged from the bin.

3. A mobile bin for temporary storage of grain and the like, comprising:
    a frame having opposite sides each mounting a ground-engaging support wheel and said frame defining an unobstructed unloading area between said opposite sides, the frame also having a rigid tongue projecting forwardly for attachment to a towing vehicle, the frame having upright struts spaced from each other to provide access therebetween into said unobstructed unloading area;
    an upright bin on the frame and having a downwardly convergent hopper bottom projecting downwardly toward said unobstructed open area and said hopper bottom having a grain outlet with a control valve to regulate discharge of grain into the unloading area, the bin also having an upright peripheral sidewall attached to the hopper bottom, the sidewall having an inwardly turned peripheral flange on the upper edge thereof;
    a telescoping wall section within the peripheral sidewall and within the peripheral flange, the telescoping wall section having an outwardly turned peripheral flange on the bottom edge thereof and in closely spaced relation to the peripheral sidewall;
    means for raising and lowering the telescoping wall section within the bin and including a plurality of pulleys mounted on the bin sidewall adjacent the upper edge thereof and spaced from each other around the periphery of the wall, a plurality of cables each trained over a respective pulley and having one end suspended within the sidewall and affixed to the telescoping wall section adjacent the lower edge thereof, each cable also having a second end suspended at the outside of the bin sidewall and trained over at least one guiding pulley, said cables being connected together for simultaneous operation, a winch on the frame and having said interconnected cables secured thereto for operating the cables and effecting raising and lowering of the telescoping wall section.

4. The mobile bin according to claim 3 and said winch being secured to the tongue of the frame.

* * * * *